United States Patent

Ahlschwede

[11] Patent Number: 5,985,341
[45] Date of Patent: Nov. 16, 1999

[54] CHOCOLATE ARTICLES

[75] Inventor: Wolfgang Ahlschwede, Loerrach, Germany

[73] Assignees: Innogram AG, Binningen/Basel, Switzerland; Futurplan AG, Vaduz, Liechtenstein

[21] Appl. No.: 09/068,994
[22] PCT Filed: Nov. 29, 1996
[86] PCT No.: PCT/EP96/05296
§ 371 Date: Oct. 13, 1998
§ 102(e) Date: Oct. 13, 1998
[87] PCT Pub. No.: WO97/19602
PCT Pub. Date: Jun. 5, 1997

[30] Foreign Application Priority Data

Nov. 30, 1995 [DE] Germany .......................... 195 44 795

[51] Int. Cl.⁶ .................................................. A23G 3/00
[52] U.S. Cl. ............................ 426/93; 426/103; 426/306
[58] Field of Search ................................ 426/306, 93, 103

[56] References Cited

U.S. PATENT DOCUMENTS

| | | | |
|---|---|---|---|
| 5,229,149 | 7/1993 | Cone | 426/91 |
| 5,360,621 | 11/1994 | Mentink et al. | 426/548 |
| 5,635,230 | 6/1997 | Aasted | 426/138 |
| 5,728,414 | 3/1998 | Terrasi | 426/104 |
| 5,783,239 | 7/1998 | Callens et al. | |

*Primary Examiner*—Nina Bhat
*Attorney, Agent, or Firm*—Oblon, Spivak, McClelland, Maier & Neustadt, P.C.

[57] ABSTRACT

Chocolate articles, especially a chocolate sweet, with an improved, new kind of taste sensation are described. For this purpose, the chocolate article contains a first filling and a second filling capable of reacting with one another and separated by a barrier which is adapted to be destroyed when the chocolate article is eaten.

17 Claims, 1 Drawing Sheet

CHOCOLATE ARTICLES

Benefit of PCT/EP96/05296 filed Nov. 29, 1996, is claimed.

FIELD OF THE INVENTION

The present invention relates to chocolate articles, especially to a chocolate sweet, with two fillings.

BACKGROUND OF THE INVENTION

Chocolate sweets are known in a great variety of forms and kinds of taste. It is also known to provide chocolate sweets with two fillings, e.g. nougat and marzipan. On eating, the consumer will however, perceive and register the two kinds of taste separately.

OBJECT OF THE INVENTION

It is the object of the present invention to provide chocolate articles, especially a chocolate sweet, giving rise to a new taste sensation and a new eating effect.

This object is achieved by a chocolate article such as a sweet containing first and second fillings capable of reacting with one another separated by a barrier adapted to be destroyed when eaten.

By means of the embodiment according to the present invention, special taste sensations can be achieved as desired, especially by physical influences on the tongue or on other parts of the mouth cavity, which cannot be achieved by conventional fillings.

Specially preferred fillings are fillings which react with one another to produce gas formation and cause, consequently, a pleasant prickling sensation.

In a preferred embodiment, carbon dioxide gas is produced in an expedient manner.

For producing the carbon dioxide gas, the first filling contains sodium bicarbonate and the second filling contains an acid, preferably a fruit acid such as citric acid.

When at least one filling contains a concentrate of champagne it goes very well with the prickling on the tongue caused by the chemical reaction.

For improved isolation from one another and from environmental influences, the respective fillings are accommodated in first and second chambers separated by a cover-forming barrier.

In order to improve the taste sensation, the chambers can consist of different materials.

The selection of the materials for the individual chambers and the barrier where the first chamber and the barrier are dark chocolate, especially medium bitter chocolate, and the second chamber is white chocolate, where the first chamber filling contains sodium bicarbonate and the second chamber filling contains citric acid, serves to improve the taste sensation still further by guaranteeing that the melting process in the mouth takes place in steps. During this melting process, the white chocolate melts first and the dark chocolate melts only afterwards with a certain amount of delay. This has the effect that the liquid, which is set free and which reacts when the chocolate sweet is chewed, is not immediately "overwhelmed" by the fat substance, which is liquefied by the warmth of the mouth, whereby the reaction would be reduced or even prevented. This permits a better development of the prickling effect, which is, at the end, rounded off not too sweetly by the delayed melting of the dark chocolate. Due to the prickling effect and the somewhat slightly bitter chocolate character remaining at the end, the chocolate sweet is given a fresher taste sensation.

Preferably, the white chocolate should be free from lecithin, since lecithin with the percentage of water in the alcohol causes a softening effect and reduces the keeping time.

When the first and second fillings contain the same basic constituents which have admixed thereto the reactive constituents, a filling which does not contain an excessive number of constituents is achieved.

A specially preferred recipe for the filling is as follows: The fillings contain as basic constituents a syrup of 25 to 30% water, 50 to 65% sugar, 5 to 12% glucose and 1.5 to 3.5% Karion having admixed thereto 45 to 64% concentrate of champagne, 60 percent by volume, based upon 100% syrup after evaporation of water, the first filling containing 35 to 50% of the overall amount of the basic constituents and 2.5 to 4% sodium bicarbonate ($NaHCO_3$), dissolved in 7 to 11.5 times the amount of water, and the second filling containing 50 to 65% of the basic constituents and 1.5 to 2.5% anhydrous citric acid.

BRIEF DESCRIPTION OF THE FIGURE

The present invention will be explained hereinbelow on the basis of an embodiment, a sectional view of which is shown in FIG. 1.

Figure 1:
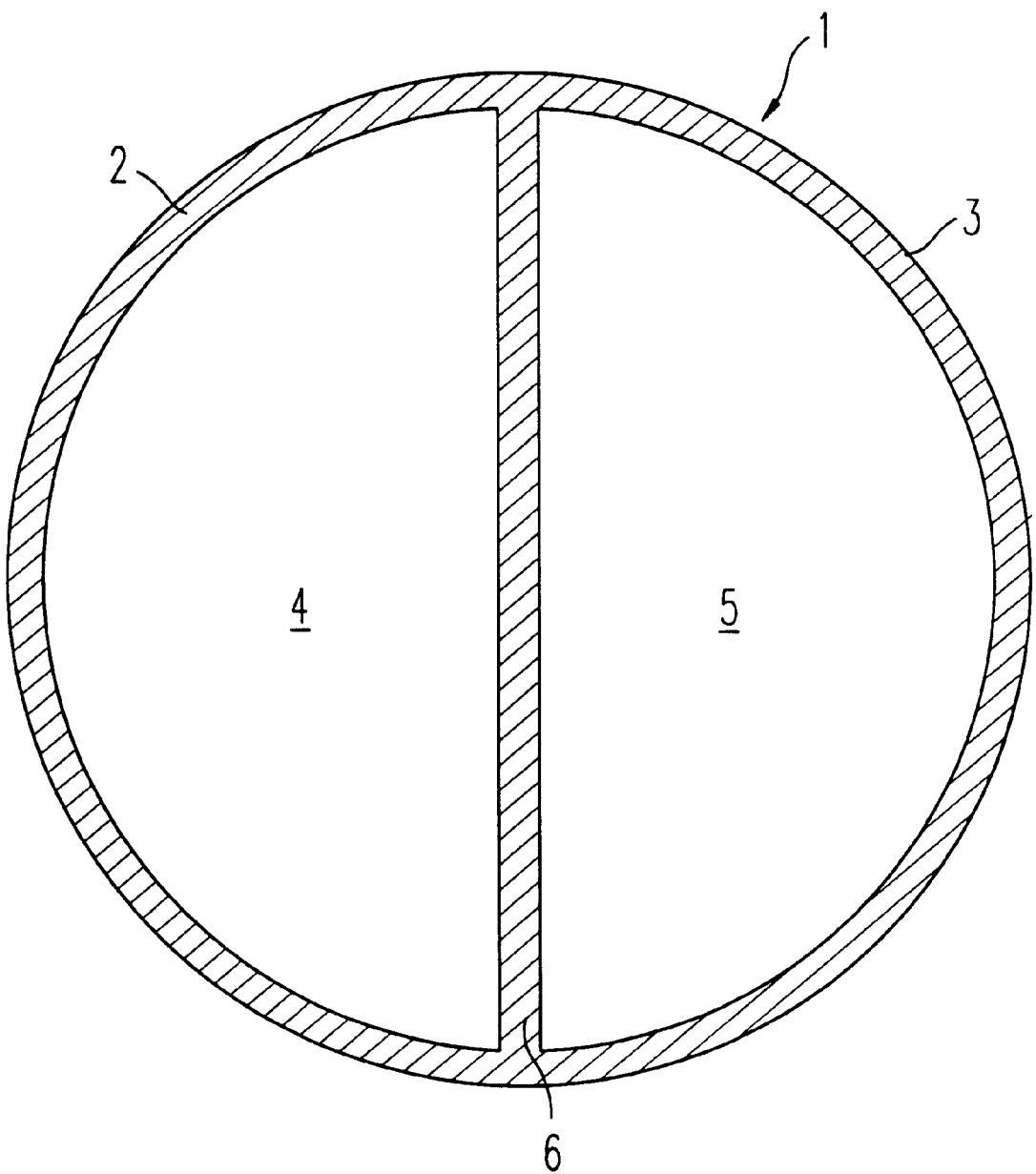
FIG. 1 shows in a sectional view a greatly enlarged representation of a round chocolate sweet 1 composed of a first semishell 2 and of a second semishell 3. The first semishell 2 consists of conventional dark chocolate and encloses a first chamber 4 containing a first filling. The second semishell 3 consists of white chocolate and encloses a second chamber 5 containing a second filling. The two chambers 4 and 5 are separated by a barrier 6 consisting of dark chocolate. The sphere can be coated with a chocolate covering and blown off in the usual way.

The first filling in the first chamber 4 and the second filling in the second chamber 5 both contain a concentrate of champagne having preferably a "mustlike" type of taste which goes better with the sweet chocolate than a concentrate of champagne having a more dry type of taste. The first filling in the first chamber 4 contains sodium bicarbonate ($NaHCO_3$). The second filling in the second chamber 5 contains an acid, especially a fruit acid, preferably citric acid. When the chocolate sweet 1 is chewed, the two fillings 4 and 5 come into contact with each other, whereby the sodium bicarbonate is decomposed by the citric acid and carbon dioxide gas is set free. This carbon dioxide gas and the champagne taste of the concentrate of champagne produce a prickling champagne chocolate sweet.

The chocolate preferably used as dark chocolate for the first chamber 4 is commercially available medium bitter chocolate. It may contain the normal percentage of lecithin, but it may also be free from lecithin in order to increase the keeping time. The white chocolate is also a commercially available type of chocolate, but it must be free from lecithin. The lecithin is replaced by an increased amount of cocoa butter.

A commercially available concentrate of champagne, 60 percent by volume, having a mustlike character is used.

The chocolate sweet 1 according to the present invention can be produced easily and at a moderate price by means of existing plants and its production is carried out as follows hereinbelow. Semishells are formed of the two kinds of chocolate, and, for reducing the dissolving power of the filling, fat is sprayed onto the inner side of said semishells.

For making the filling, a syrup with the mixing ratio following hereinbelow is cooked at 80° R. (approx. 100° C.)

| water | 25–30 | preferably 29.54% |
|---|---|---|
| sugar | 50–65 | preferably 59.07% |
| glucose | 5–12 | preferably 8.44% |
| Karion | 1.5–3.5 | preferably 2.95% |
| | | 100.00% |

This amount of syrup=100% has added thereto a concentrate of champagne, 60 percent by volume, 45–65%, preferably 55.3%.

This basic mixture syrup/champagne is used for forming two different filling quanitities.

For producing the first filling, the first subquantity= 35–50%, preferably 42.67%, of the basic mixture has added thereto sodium bicarbonate (NaHCO$_3$) 2.5–4%, preferably 3.49%, dissolved in 7–11.5 times, preferably 9.6 times, the amount of water at 20°.

For producing the second filling, the second subquantity 50–65%, preferably 57.33%, of the basic mixture has added thereto anhydrous citric acid 1.5–2-5%, preferably 1.98%.

The first filling containing the sodium bicarbonate mixture is to be filled into the first chamber 4 of the dark chocolate hemisphere 2 where it is covered with the barrier 6 of dark chocolate.

The second filling with the citric acid added thereto is to be filled into the second chamber 5 of the white chocolate hemisphere 3 whereupon the edges are heated and the covered dark hemisphere 2 is attached such that it is centered relative to said white hemisphere 3.

Following this, the whole sphere 1 is to be coated with white chocolate and subjected to strong blowing off until a marbled effect is given. The coating serves to additionally stabilize the hemisphere attached.

As a modification of the embodiment described and shown hereinbefore, the kind of taste of the filling can be varied (e.g. by a different flavour concentrate). The chocolate article according to the present invention can also consist of dark chocolate alone; this will cause a marginal intensification of the prickling/effervescent effect and produce, at the end, a distinct bitter chocolate flavour which could definitely be desired by specific groups of consumers. The chocolate article can also have some other geometrical form.

In the case of more solid fillings, it is not absolutely necessary to include said fillings in chambers; such fillings can, for example, be simply separated by a barrier and provided with a conventional coating. The fillings may also contain other components, e.g. pieces of fruit.

I claim:

1. A chocolate article (1) comprising a shell (2,3) of chocolate which encloses a first chamber (4) comprising a liquid-containing first filling and a second chamber (5) comprising a liquid-containing second filling, wherein the first and second chambers are separated by a barrier (6) which is destroyable when the chocolate article is eaten, and the first and second fillings are reactive with one another to produce a gas.

2. A chocolate article according to claim 1, wherein the gas is carbon dioxide gas.

3. A chocolate article according to claim 1, wherein the first filling comprises sodium bicarbonate.

4. A chocolate article according to claim 3, wherein the second filling comprises an acid.

5. A chocolate article according to claim 1, wherein the second filling comprises an acid.

6. A chocolate article according to claim 5, wherein the acid is citric acid.

7. The chocolate article of claim 5, wherein said acid is a fruit acid.

8. A chocolate article according to claim 1, wherein at least one filling comprises a champagne concentrate.

9. A chocolate article according to claim 1, wherein the first and second fillings are syrups, the first filling being held in the first chamber and the second filling being held in the second chamber, said first and second chambers being separated from each other by a cover forming the barrier.

10. A chocolate article according to claim 9, wherein the first and second chambers are made from different materials.

11. A chocolate article according to claim 10, wherein the shell enclosing the first chamber and the barrier consist of dark chocolate and the first filling comprises sodium bicarbonate, and the shell enclosing the second chamber consists of white chocolate and the second filling comprises citric acid.

12. A chocolate article according to claim 11, wherein the white chocolate is free from lecithin.

13. The chocolate article of claim 11, wherein said dark chocolate is medium bitter chocolate.

14. A chocolate article according to claim 1, wherein the first and second fillings comprise the same basic constituents which have admixed thereto reactive constituents.

15. A chocolate article according to claim 1, wherein at least one of the first and second fillings comprise as basic constituents a syrup of 25 to 30% water, 50 to 65% sugar, 5 to 12% glucose, and sorbitol having admixed thereto 45 to 64% concentrate of champagne, 60 percent by volume, based upon 100% syrup after evaporation of water, the first filling comprising 35 to 50% of the overall amount of the basic constituents and 2.5 to 4% of sodium bicarbonate, dissolved in 7 to 11.5 times the amount of water, and the second filling containing 50 to 65% of the basic constituents and 1.5 to 2.5% anhydrous citric acid.

16. A chocolate article according to claim 1, wherein the first and second fillings comprise as basic constituents a syrup of 29.54% water, 59.07% sugar, 8.44% glucose, and sorbitol having admixed thereto 55.3% concentrate of champagne, 60 percent by volume, based upon 100% syrup after evaporation of water, the first filling containing 42.67% of the overall amount of the basic constituents and 3.49% sodium bicarbonate, dissolved in 9.6 times the amount of water and the second filling containing 57.33% of the basic constituents and 1.98% anhydrous citric acid.

17. The chocolate article of claim 1, wherein said article is a sweet.

* * * * *